United States Patent [19]
Skrzypczyk

[11] 3,824,419
[45] July 16, 1974

[54] TRACTION MOTOR INSPECTION COVER

[75] Inventor: William G. Skrzypczyk, Erie, Pa.

[73] Assignee: General Electric Company, Erie, Pa.

[22] Filed: Apr. 4, 1973

[21] Appl. No.: 347,857

[52] U.S. Cl.................. 310/89, 310/255, 220/34
[51] Int. Cl. ............................................ H02k 5/10
[58] Field of Search .......... 310/85, 88, 89, 255, 49; 220/30, 34, 35, 16

[56] References Cited
UNITED STATES PATENTS

| | | | |
|---|---|---|---|
| 2,385,364 | 9/1945 | Larson | 220/34 |
| 2,774,506 | 12/1956 | Miller | 220/34 |
| 3,506,860 | 4/1970 | Rosenthal | 310/49 |
| 3,662,198 | 5/1972 | Adams, Jr. | 310/89 |
| 3,666,978 | 5/1972 | Renner | 310/89 |

FOREIGN PATENTS OR APPLICATIONS

| | | | |
|---|---|---|---|
| 340,657 | 1/1931 | Great Britain | 220/34 |

Primary Examiner—J. D. Miller
Assistant Examiner—Harry E. Moose, Jr.
Attorney, Agent, or Firm—Dana F. Bigelow; Walter C. Bernkopf

[57] ABSTRACT

An arcuate cover for a motor housing opening wherein an adaptor plate is attached to the housing and an articulated cover is hingedly secured thereto to open downwardly and close upwardly with provision for securing the cover in a closed position. The cover is articulated proximate its midpoint and a torsion spring is provided to bias the two concave portions together when in the open position so as to limit its depending length. A second oppositely disposed articulated section may be provided which opens upwardly and is securable to the lower section when in the closed position.

11 Claims, 5 Drawing Figures

TRACTION MOTOR INSPECTION COVER

BACKGROUND OF THE INVENTION

This invention relates generally to d-c motors and more particularly to captive covers for inspection openings of traction motors.

It is customary practice to provide electric traction motors with an opening permitting access to and the inspection of vital motor parts located inside the motor housing and including notably the commutator equipment. In particular traction motors for transit equipment application require elaborate preventative maintenance procedures. Since the commutator and its brushes are among the most vital and vulnerable parts of a traction motor, an inspection opening is provided in the housing of the traction motor which enables a maintenance man to inspect, test and maintain the commutator and brushes. An inspection plate on cover is connected to the housing over the inspection opening to prevent debris from flying into the inspection opening. Since the motors are subjected to severe vibrational forces, a locking device is required to prevent the clattering and opening of the cover during the travel of the locomotive. A plurality of bolts on the housing provide a secure arrangement; however, the excessive time required for frequent disassembly and assembly does not warrant such a practice. Further, the likelihood of a maintenance man misplacing some of the bolts or forgetting to replace the plate is relatively good.

In transit applications traction motors are characteristically mounted rigidly to the truck frame and are connected by a flexible gear-type coupling to a gear unit mounted to the axle. Most trucks have outboard journal bearings and are supported on steel equalizer springs so as to severely limit the space around the motor. Four pole motors having brushholder assemblies radially spaced at 90° apart, customarily have a pair of diametrically opposed inspection openings with each providing access to two of the brushholder assemblies. The openings are made more difficult by the close proximity of the axle on one side of the motor and the truck sill on the opposite side thereof. The lower inspection opening cover is further restricted by its close proximity to the track directly below. The limited clearance between the cover and the track makes it paramount that the cover does not excessively depend downwardly when swinging to an open position.

It is therefore an object of this invention to provide an improved inspection cover arrangement for a traction motor.

Another object of this invention is the provision for an inspection cover which is not removed from the motor.

Yet another object of this invention is the provision for a traction motor inspection cover which can be securely fastened in the closed position to prevent clattering and inadvertant opening.

Still another object of this invention is the provision for a cover which can be opened and closed in a timely manner.

A further object of this invention is the provision for a motor inspection cover which can accommodate limited clearance conditions when in the open position.

Yet another object of this invention is the provision for a traction motor inspection cover which is economical to manufacture and extremely functional in use.

These objects and other features and advantages become more readily apparent upon reference to the following description when taken in conjunction with the appended drawings.

SUMMARY OF THE INVENTION

Briefly, in accordance with one aspect of the invention an arcuate adaptor plate is secured at its ends to the motor frame so as to surround the inspection opening. A cover is hingedly secured at the lower end of the adaptor plate and is pivotal upwardly to close the inspection opening. The cover is articulated at substantially its midpoint and a pair of torsion springs are disposed at the joint to bias the inner sides of the two joints together when the cover is moved toward the open position, thereby preventing the upper section from depending below the clearance limits at the lower vicinity of the motor. A clearance will thus exist between the cover and the track below in the event that the cover is inadvertantly left open or accidently caused to open during movement of the vehicle. When in the closed position the cover is securely latched to the adaptor plate. One embodiment of the invention includes a second articulated cover element hinged at the top of the inspection opening and having its free end pivotal downwardly to abut the edge of the lower section. A latch device is then provided to secure the section together when in the closed position.

In the drawings as hereinafter described, a preferred embodiment and a modified embodiment is depicted; however, various other modifications and alternate constructions can be made thereto without departing from the true spirit and scope of the invention.

DESCRIPTION OF THE PREFERRED EMBODIMENT

Figure 1:
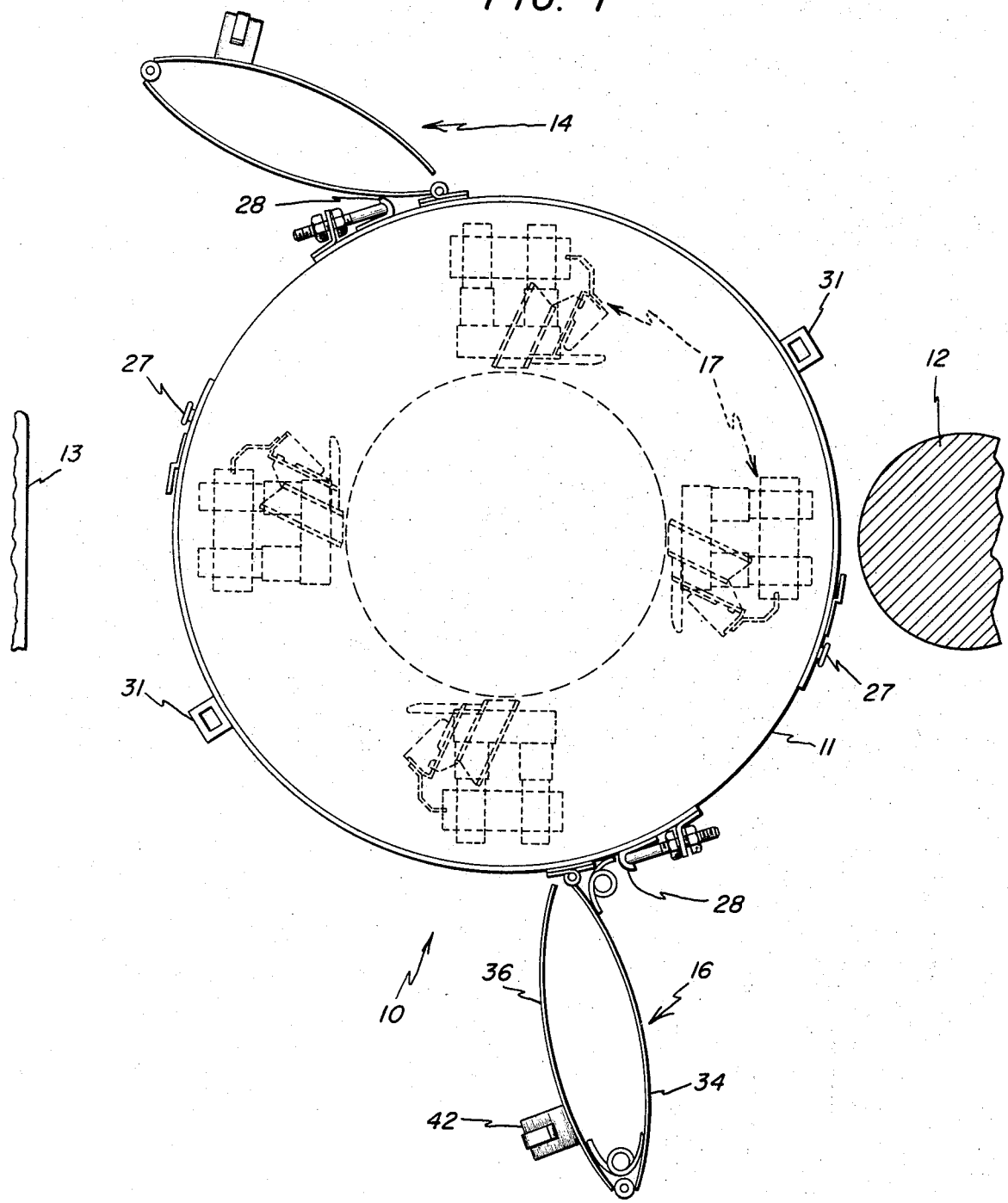
FIG. 1 is a side plan view of a preferred embodiment of the invention as seen in a typical transit installation.

Reference is now made to FIG. 1 wherein the invention is indicated generally at 10 as applied to a cylindrical traction motor housing 11 in a typical transit installation. Motive drive is generally provided through a gear assembly (not shown) to turn an axle 12 aligned parallel to the axis of and in close proximity to the motor housing 11. On the opposite side of the motor housing 11 is a center sill 13 of the vehicle truck disposed in close proximity to the housing and further limiting access to the motor for inspection and maintenance purposes. Since the motor is located at the lower area of the engine frame (not shown) its lower side is near the tracks (not shown), with a limited clearance distance existing therebetween.

The d-c traction motors utilized for the propulsion of railway vehicles customarily are of the four pole type and have their brushholder assemblies 17 radially spaced 90° apart and oppositely disposed in the vertical and horizontal axis as shown in FIG. 1. Access is thus best provided by diametrically opposed top 14 and bottom 16 cover assemblies, each assembly being symmetrically located between the vertical and horizontal axes and accommodating adjacent horizontal and vertical brushholder assemblies 17. Each cover assembly preferably spans at least a 90° section of the motor to accommodate access to the brushholder assemblies 17.

Figure 2:
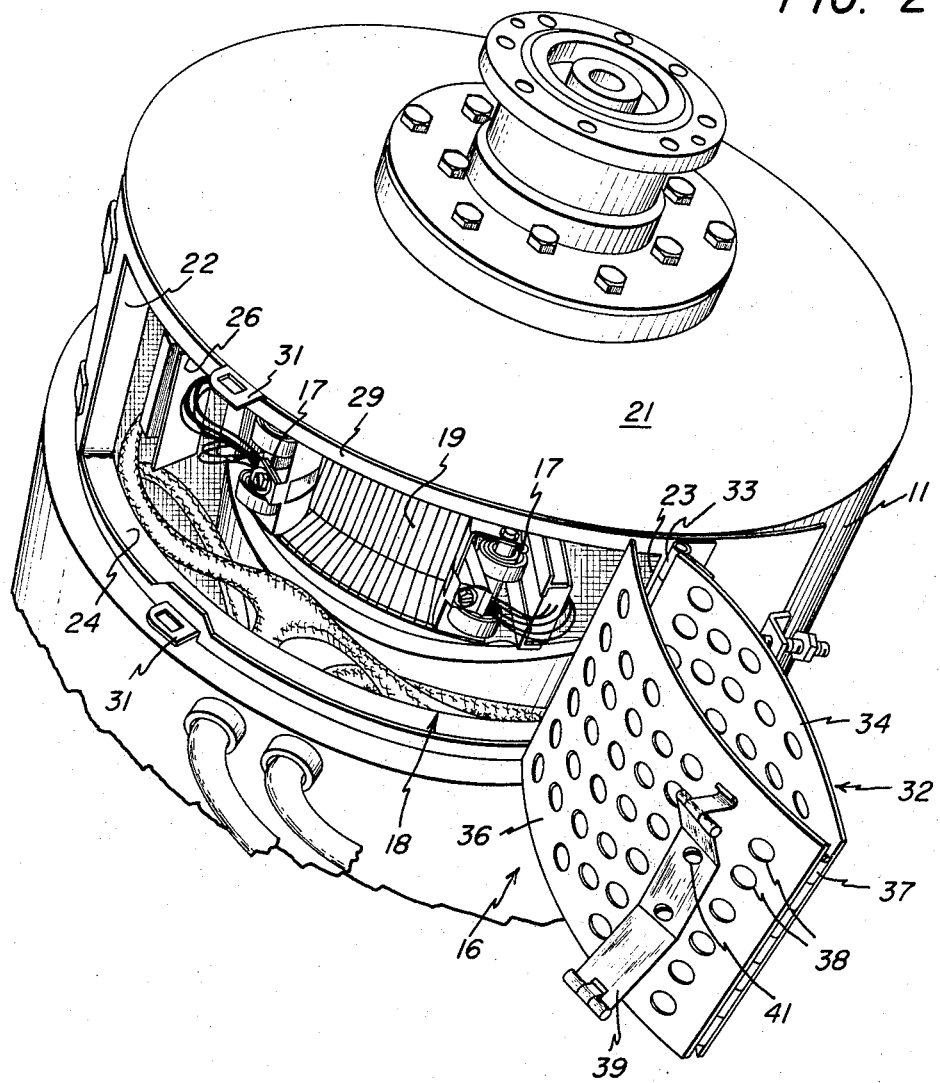
FIG. 2 is a perspective view of the preferred embodiment of the invention with the cover in the open position.

Peculiar to this invention is the limited clearance space in the vicinity of the bottom cover assembly 16. It will thus be described in terms of the bottom assembly 16 with the understanding that the upper assembly 14 may include any or all features included therein but whose requirements are not as stringent as are those of the lower assembly 16. Referring now to FIG. 2 the motor housing 11 is seen with an inspection opening 18 provided therein to expose adjacent brushholder assemblies 17 and portions of the commutator 19. The opening 18 spans a 90° arc in the lower left quadrant of the motor housing as seen from the commutator end 21 thereof, and has upper 22 and lower 23 edges and side edges 24 and 26. Upward from the upper edge 22, on the outer side of the motor housing 11 is a pair of lugs 27 (FIG. 1) extending from the housing. Similarly, below the lower edge 23 is a hook 28 (FIG. 1) extending from the housing periphery in a direction tending away from the opening 18. Surrounding the opening 18 is a metal adaptor plate 29 conforming the periphery of the motor housing 11 and having means for securing it thereto the lugs 27 and hook 28, respectively. Extending radially outward from the sides of the adaptor plate 29, proximate its midpoint, are a pair of eyelets 31 to which a cover can be detachably secured in a manner as will hereinafter be described.

A cover 32 is mounted on a stationary hinge 33 adjacent to the opening lower edge 23 and is adapted to pivot downwardly to an open position as shown in FIG. 2. The cover 32 is articulated and comprises first and second portions, 34 and 36, pivotably joined together by a movable hinge 37. Their sizes are preferably substantially equal, with their widths spanning the axial distance between the side edges 24 and 26 and their combined lengths spanning the circumferential distance between the upper and lower edges 22 and 23. Their preformed shape conforms to the motor frame periphery and the arcuately preformed adaptor plate 29. A plurality of holes 38 are formed therein to provide for free ventilation of the commutator 19. A locking device 39 is secured to the second portion by suitable means such as by rivets 41 at a position adjacent the movable hinge 37 and interacts with the eyelets 31 to lock the cover in a closed position.

Figure 3:
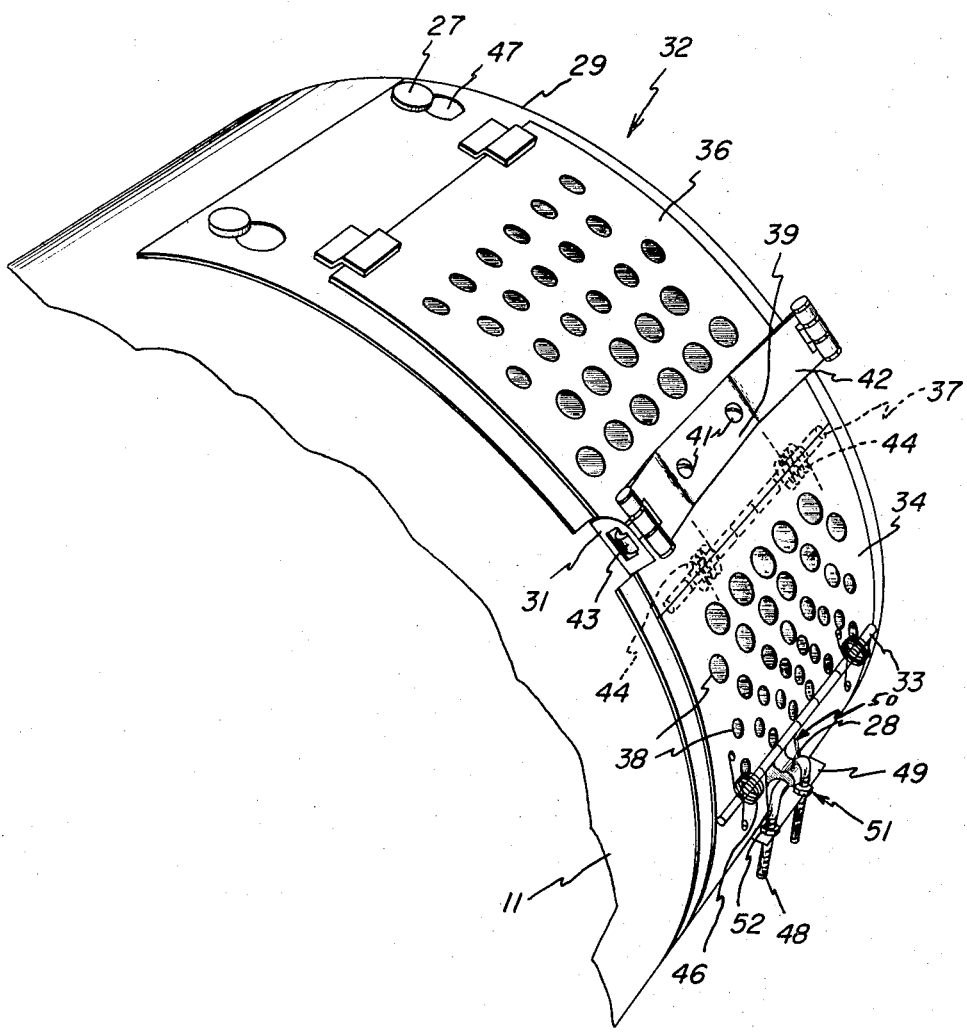
FIG. 3 is a perspective view of the cover and adaptor plate portions of the invention.

FIG. 3 shows the cover 32 in a closed position with its first and second portions 34 and 36 in contiguity with the outer surface of the adaptor plate 29. The locking device 39 comprises a pair of oppositely extending spring arms 42 reaching outwardly over the eyelets 31 with each having depending therefrom a pivotal hook 43 which is adapted to grasp the underside of its associated eyelet 31 to secure the cover in a closed position. The spring arms provide a biasing force to maintain a tight locking interrelationship with the adaptor plate and eliminates clatter that may otherwise result from vibratory forces.

Disposed on the inner side of the cover 32 adjacent the movable hinge 37 is a pair of axially spaced torsion springs 44 which interact between the first and second portions 34 and 36 in such a manner as to bias the respective inner sides toward each other when the cover 32 is opened as shown in FIG. 2. This folding-cover feature provides a compact door arrangement and ensures that when it is in the open position it will not hang down to a point below the clearance level and thereby engage the track surface below during operational movement of the vehicle. Alternate biasing arrangements may be provided such as tension springs interposed between the two cover portions; however, the torsion springs 44 are preferred for reasons of convenience and simplicity. A second pair of torsion springs 46 may be provided at the stationary hinge 33 which interacts to bias the cover to a closed position as illustrated in FIG. 3.

As mentioned hereinbefore, means are provided to secure the adaptor plate 29 to the motor housing periphery by connection to the existing lugs 27 and hook 28 extending from the housing. Provided on the upper end of the adaptor plate 29 are a pair of openings 47 for placement over the lugs 27 to facilitate a stationary mounting arrangement. At the lower end of the adaptor plate 29 is provided a hole 50 through which the hook 28 extends and curves away from the hinge 33 to provide a base to which a biasing force can be applied by an impinging clamp 48. The clamp 48 is a U-shape device adjustably mounted to the adaptor plate by an angle iron 49 having a pair of holes 51 formed therein. Adjustment is made to the clamp 48 by selective setting of the nuts 52 located on each side of the angle iron 49. As the nuts are moved toward the ends of the clamp 48 the adaptor plate is drawn up tightly against the housing periphery in a semi-permanent installation. The cover assembly 16 need not be removed for inspection but remains captive to prevent loss thereof. The biased hinge installation provides further protection by the proper positioning of the cover when in the open condition.

Figure 4:
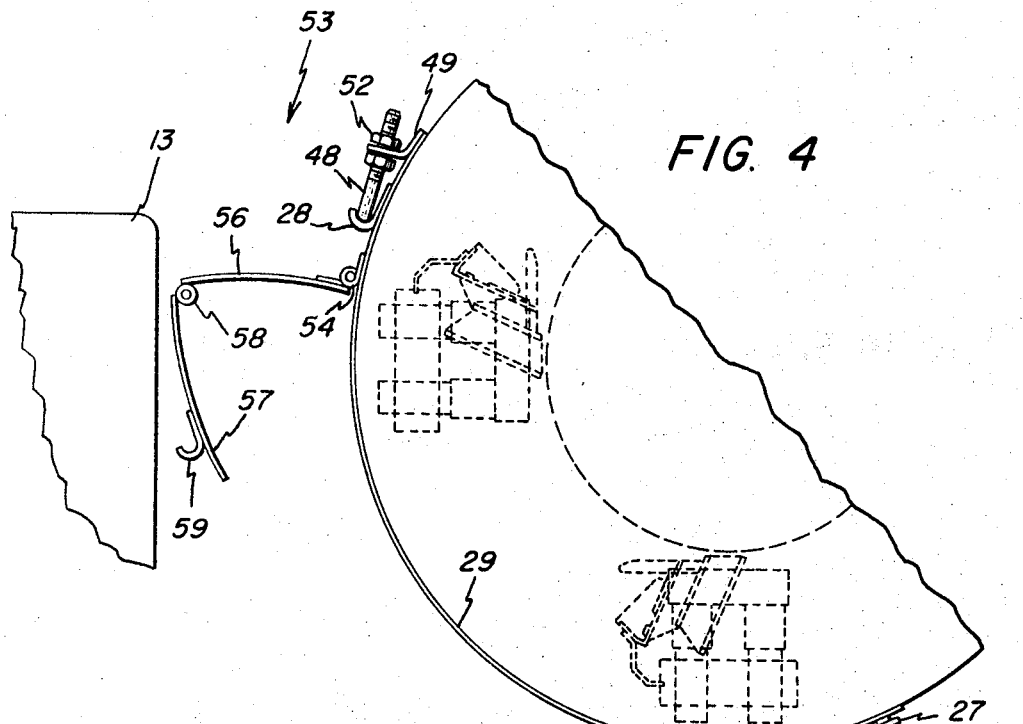
FIG. 4 is a side plan view of a modified embodiment of the invention with the cover in an open position.
Figure 5:
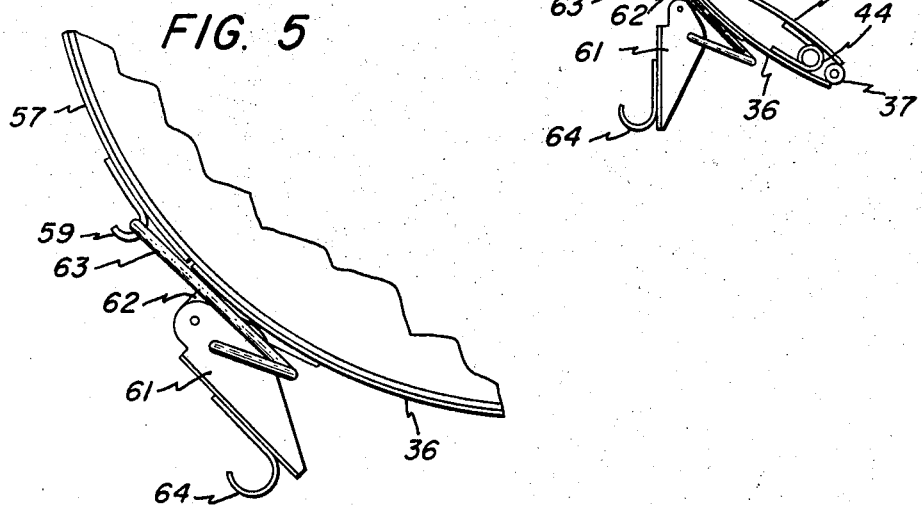
FIG. 5 is a side view of the latch portion of the modified embodiment when the cover is in a closed position.

As can be seen in the embodiment of FIG. 1, access may be gained to an adjacent pair of brushholder assemblies by the provision of an inspection opening which extends around the housing in a 90° arc. Although inspection alone may be satisfactorily facilitated with such a limited access opening, maintenance may be difficult with certain types of brushholder assemblies. If additional space is required, it may be necessary to provide a larger opening as, for example, one which spans a 110° arc of the motor housing. It may then be that the added length to the cover, which must accordingly extend around the 110° arc, will exceed the clearance limit below the motor when in the open position. The embodiment of FIG. 4 illustrates a modified cover wherein, in addition to first and second cover portions, 34 and 36, just described a lift cover portion 53 is provided near the inspection opening upper edge 22. It is mounted to the adaptor plate by a hinge 54 and comprises upper and lower elements 56 and 57 pivotably connected by a standard hinge 58. The articulated feature allows the lift cover portion 53 to clear the adjacent center sill 13 when the lift cover portion 53 is raised to an open position as seen in FIG. 4 or lowered to a closed position. A hook element 59 is securely fastened as by welding to the outer side of the cover lower element 57 for attachment to the cover second portion 36. For such a design a cam lever 61 is pivotally mounted to a bar 62 projecting from the cover second portion 36, and has attached thereto a two-link bail 63, which is adapted to engage the hook element 59 as shown in FIG. 5. A handle 64 is provided to operate the lever 61 in bringing the cover combination to a secure position. Again, the first and second cover portions 34 and 36 have torsion springs 44 acting therebetween to prevent the latter's hanging to a point below the clearance level. A second pair of torsion springs 46 may also be provided at the stationary hinge 33 as in the design of FIG. 3. The lift cover portion 53 requires no springs since neither its gravitated position nor its open position present problems with respect to clearance. The adaptor plate 29 is attached in a manner similar to that described hereinbefore; however, the relative positions of the lugs 27 and the hook 28, along with their mating parts, may be interchanged for convenience of assembly and use of available space.

What is claimed as new and is desired to secure by Letters Patent of the United States is:

1. An improved cover for a motor of the type having a commutator, a curved motor housing enclosing the commutator, an opening in the housing to provide access to the commutator, the opening being substantially rectangular in form and having an upper and lower edge with the lower edge proximate the bottom of the housing, and apparatus for mounting a cover over the opening, wherein the improvement comprises:
   a. a first cover portion mounted by a top end on a first stationary hinge adjacent the opening lower edge and pivotable to open and closed positions respectively, said first cover portion being arcuate in form and having an inner surface which conforms to the periphery of the housing, and having a lower end;
   b. a second cover portion pivotally mounted at a hinge-end to said first cover portion lower end, said second cover portion being arcuate in form and having an inner surface which conforms to the periphery of the housing and having a free end;
   c. means for biasing said inner surface of said second cover portion towards said inner surface of said first cover portion when the latter is pivoted toward an open position;
   d. means for securing in a closed position said second cover portion to said housing to cover at least a portion of said opening with each of said first and second cover portions.

2. A cover as set forth in claim 1 wherein said apparatus for mounting includes an adaptor plate interposed between the motor housing and the cover, said adaptor plate being secured to and in conformity with the motor frame periphery proximate the opening and said first cover portion is hingedly secured to said adaptor plate at one end thereof.

3. A cover as set forth in claim 2 wherein said securing means comprises at least one locking arm secured to said second cover portion and extending outwardly toward said adaptor plate, and a locking tab extending from said adaptor plate to engage said locking arm and hold the inner surfaces of said first and second cover portion in contiguity with said adaptor plate.

4. A cover as set forth in claim 1 and including:
   a. a lift cover portion mounted on a second stationary hinge adjacent the opening upper edge said lift cover portion conforming to the housing periphery and being pivotable upwardly to an open position, and downwardly to a closed position wherein the end opposite its hinged end is contiguous with said second cover portion free-end when in a closed position; and
   b. means for securing said lift cover portion to hold it in the closed downward position.

5. A cover as set forth in claim 4 wherein said means for securing said second cover portion and said means for securing said lift cover portion comprises:
   a. a fastening device having a first element secured to said second cover portion and a second element secured to said lift cover portion; and
   b. means for securing said first and second elements together when in a closed position.

6. A cover as set forth in claim 1 wherein said biasing means comprises a torsion spring disposed at the pivotal junction of said first cover portion lower-end and said second cover portion hinge-end, said torsion spring reacting on each of said first and second cover portions.

7. A cover as set forth in claim 1 wherein said first and second cover portions are substantially equal in size.

8. A cover as set forth in claim 1 and including a torsion spring disposed at said first stationary hinge for biasing said first cover portion toward a closed position.

9. A cover as set forth in claim 1 and including a plurality of apertures formed in said first and second cover portions to facilitate ventilation of the commutator.

10. A cover as set forth in claim 4 wherein said lift cover portion is articulated and comprises upper and lower elements of substantially equal size.

11. A cover as set forth in claim 1 wherein said biasing means is located near said second cover portion hinge end, and further wherein said biasing means interacts between said first and second cover portions.

* * * * *